United States Patent [19]
Tilles et al.

[11] 3,897,492
[45] *July 29, 1975

[54] METHOD OF MAKING CARBAMOYL SULFOXIDE DERIVATIVES

[75] Inventors: Harry Tilles, El Cerrito; Alan A. MacDonald, Albany, both of Calif.

[73] Assignee: Stauffer Chemical Company, Westport, Conn.

[ * ] Notice: The portion of the term of this patent subsequent to July 22, 1992, has been disclaimed.

[22] Filed: June 18, 1973

[21] Appl. No.: 371,329

Related U.S. Application Data

[63] Continuation-in-part of Ser. No. 280,393, Aug. 14, 1972, abandoned.

[52] U.S. Cl...... 260/551 R; 260/455 A; 260/607 A; 71/100; 71/98
[51] Int. Cl.² ............... C07C 103/76; C07C 147/14
[58] Field of Search..................... 260/551, 470, 479

[56] References Cited
UNITED STATES PATENTS 3,326,663   6/1967   Soloway et al....................... 71/103

*Primary Examiner*—Harry I. Moatz
*Attorney, Agent, or Firm*—Daniel C. Block

[57] ABSTRACT

Intermediate compounds and the process of manufacturing herbicidally active sulfoxide and sulfone compounds are described herein. The intermediate compounds have the following generic formula:

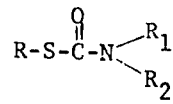

wherein R is selected from the group consisting of halophenyl, phenalkyl, substituted phenalkyl, wherein said substituents can be selected from halogen, alkyl and haloalkyl; $R_1$ and $R_2$ can be the same or different and can be selected from the group consisting of lower alkyl, cycloalkyl, alkenyl, alkynyl and benzyl. The active compounds are made by reacting the intermediate compound with an oxidizing agent.

2 Claims, No Drawings

METHOD OF MAKING CARBAMOYL SULFOXIDE DERIVATIVES

CROSS-REFERENCE TO RELATED APPLICATION

This application is a continuation-in-part of application Ser. No. 280,393, filed Aug. 14, 1972, now abandoned.

DESCRIPTION OF THE INVENTION

This invention is directed to a novel group of compounds which may be generally described as sulfoxide and sulfone derivatives of thiocarbamates which are highly active herbicides. The compounds of the present invention are represented by the generic formula:

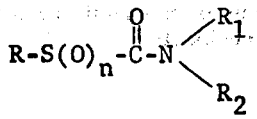

wherein $n$ can be 1 or 2; R can be selected from the group consisting of halophenyl, phenalkyl, substituted phenalkyl, wherein said substituents can be selected from halogen, alkyl and haloalkyl; $R_1$ and $R_2$ can be the same or different and can be selected from the group consisting of lower alkyl, cycloalkyl, alkenyl, alkynyl and benzyl.

The above-noted compounds can be prepared by reacting an oxidizing agent such as peracetic acid or m-chloroperoxybenzoic acid with a thiocarbamate compound corresponding to the following formula:

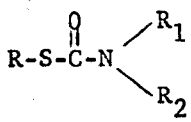

wherein R, $R_1$ and $R_2$ have been defined above. The reaction is carried out in the presence of a solvent such as chloroform, methylene chloride, benzene or toluene, and at a reduced temperature of from about −25°C. to about 65°C. The amount of oxidizing agent used must be at least one molar equivalent to form the sulfoxide derivative and at least two molar equivalents to form the sulfone derivatives.

The thiocarbamate compounds are known herbicides and their method of synthesis is known; see U.S. Pat. Nos. 2,913,327, 2,983,747, 3,133,947, 3,175,897 and 3,185,720 for example. However, the use of these thiocarbamates as reactive intermediates to form other compounds that also have pesticidal activity is unexpected.

In order to illustrate the merits of the present invention the following examples are provided:

EXAMPLE 1

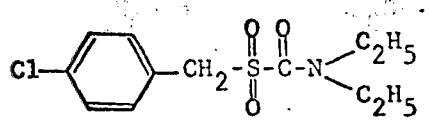

A solution was formed containing 7.5 g. of m-chloroperoxybenzoic acid in 100 cc. of methylene chloride in a reaction vessel. The temperature of this solution was regulated to 30°C., wherein 4.4 g. (0.017 mole) of S-4-chlorobenzyl diethylthiocarbamate was added over a period of one minute. At the end of the addition, a rapid reflux began and the temperature rose to 41°C. The reaction was allowed to take place for about 40 minutes, wherein the mixture was cooled and filtered and the cake was washed with two portions of 25 cc. of methylene chloride. The combined filtrate was washed with four portions of 50 cc. of 5% sodium carbonate solution and two portions of 50 cc. of water, then dried over magnesium sulfate and concentrated in a rotary evaporator, first under a water pump vacuum and finally under high vacuum to yield 4.4 g. of product, $n_D^{30}$ - 1.5425. After standing for a short period, the liquid crystallized to yield a product of 4.4 g. having a m.p. of 64°–72°C.

EXAMPLE 2

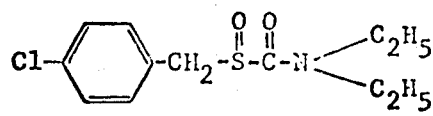

A solution was formed containing 10.7 g. (0.0525 mole) of m-chloroperoxybenzoic acid in 200 cc. of methylene chloride. This solution was cooled to −16°C., wherein 12.9 g. (0.05 mole) of S-4-chlorobenzyl diethylthiocarbamate was added over a period of four minutes. The reaction was allowed to take place for one hour, wherein the temperature was allowed to go to −5°C. The temperature was held at −5°C. for another 30 minutes, wherein the temperature was allowed to reach 21.5°C. The solution was then cooled in an ice bath, wherein the cold mixture was filtered and the cake was washed with two portions of 25 cc. of methylene chloride. The combined filtrate was washed with four portions of 100 cc. of 5% solution of sodium carbonate and two portions of 100 cc. of water, dried over magnesium sulfate and concentrated in a rotary evaporator, first under water pump vacuum and finally under high vacuum to yield 12.3 g. of product, $n_D^{30}$ - 1.5678. This product was further distilled to yield 10.6 g. of product, $n_D^{30}$ - 1.5680.

EXAMPLE 3

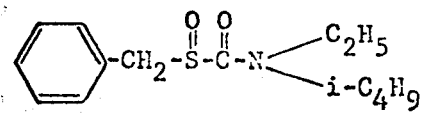

In a 500 ml. 3-necked flask equipped with a thermometer, mechanical stirrer, and addition device were placed 250 ml. of methylene chloride and 12.6 g. (0.05 mole) of S-benzyl ethylisobutylthiocarbamate dissolved in 25 ml. of methylene chloride. Stirring was begun and the temperature lowered to −30°C. with dry ice. Then, 8.7 g. (0.05 mole) of m-chloroperoxybenzoic acid was rapidly added and the temperature held at −30°C. for 15 minutes. The temperature then was allowed to rise to 0°C. over a 30 minute period and then up to 4°C. The cold mixture was filtered and the filtrate washed with three 50 ml. portions of 5% potassium carbonate solution, two 50 ml. portions of water and then dried over magnesium sulfate and stripped to obtain a colorless viscous liquid product weighing 13.5 g., $n_D^{30}$ - 1.5403.

EXAMPLE 4

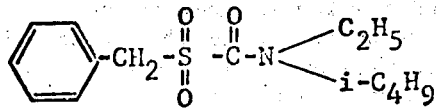

A solution was formed containing 17.3 g. (0.10 mole) of m-chloroperoxybenzoic acid in 300 ml. of methylene chloride. This mixture was warmed to 30°C. whereupon 12.6 g. (0.05 mole) of S-benzyl ethylisobutylthiocarbamate in 25 ml. of methylene chloride was added at a rate such that gentle reflux was maintained. Stirring at reflux was carried out for thirty minutes and then the solution was cooled to 5°C. in an ice bath. The solid was filtered off and washed with cold methylene chloride. The combined portions of filtrate were washed with three 50 ml. portions of 5% potassium carbonate solution, two 50 ml. portions of water, dried over magnesium sulfate, and then stripped to obtain 14.0 g. of product, $n_D^{30}$ - 1.5255.

Other compounds were prepared in an analogous manner starting with the appropriate starting materials as outlined above. The following is a table of compounds representative of those embodied by the present invention. Compound numbers have been assigned to them and are used for identification throughout the balance of the specification.

TABLE I

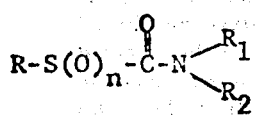

| Compound No. | R | $R_1$ | $R_2$ | n |
|---|---|---|---|---|
| 1 | -CH$_2$-⟨C$_6$H$_4$⟩-Cl | -C$_2$H$_5$ | -C$_2$H$_5$ | 2 |
| 2 | -CH$_2$-⟨C$_6$H$_4$⟩-Cl | -C$_2$H$_5$ | -C$_2$H$_5$ | 1 |
| 3 | -⟨C$_6$H$_4$⟩-Cl | n-C$_3$H$_7$ | n-C$_3$H$_7$ | 1 |
| 4 | -CH$_2$-⟨C$_6$H$_5$⟩ | -CH$_3$ | -CH(CH$_3$)-C≡CH | 1 |
| 5 | -CH$_2$-⟨C$_6$H$_5$⟩ | -C$_2$H$_5$ | i-C$_4$H$_9$ | 1 |
| 6 | -CH$_2$-⟨C$_6$H$_5$⟩ | n-C$_3$H$_7$ | n-C$_3$H$_7$ | 1 |
| 7 | -CH$_2$-⟨C$_6$H$_5$⟩ | n-C$_3$H$_7$ | n-C$_4$H$_9$ | 1 |

TABLE I (Cont.)

| Compound No. | R | $R_1$ | $R_2$ | n |
|---|---|---|---|---|
| 8 | $-C_2H_4-$C₆H₅ | $n-C_3H_7$ | $n-C_3H_7$ | 1 |
| 9 | $-C_3H_6-$C₆H₅ | $n-C_3H_7$ | $n-C_3H_7$ | 1 |
| 10 | $-CH_2-$C₆H₅ | $-C_2H_5$ | $i-C_4H_9$ | 2 |
| 11 | $-CH_2-$C₆H₅ | $n-C_3H_7$ | tetrahydrothiopyranyl | 1 |
| 12 | $-CH_2-$C₆H₄-$CF_3$ | $-C_2H_5$ | $-C_2H_5$ | 1 |
| 13 | $-CH_2-$C₆H₄-$CF_3$ | $n-C_3H_7$ | $n-C_3H_7$ | 1 |
| 14 | $-CH_2-$C₆H₄-$Cl$ | $n-C_3H_7$ | $n-C_3H_7$ | 1 |
| 15 | $-CH_2-$C₆H₄-$Cl$ | $-C_2H_5$ | $n-C_4H_9$ | 1 |
| 16 | $-CH_2-$C₆H₄-$CF_3$ | $n-C_3H_7$ | $n-C_3H_7$ | 2 |
| 17 | $-C_3H_6-$C₆H₅ | $n-C_3H_7$ | $n-C_3H_7$ | 2 |
| 18 | $-CH_2-$C₆H₅ | $-C_2H_5$ | $-CH_2-$C₆H₅ | 1 |
| 19 | $-CH_2-$C₆H₄-$CH_3$ | $-C_2H_5$ | $-CH_2CH=CH_2$ | 1 |
| 20 | $-CH_2-$C₆H₄-$CH_3$ | $n-C_3H_7$ | $n-C_3H_7$ | 2 |

TABLE I (Cont.)

| Compound No. | R | $R_1$ | $R_2$ | n |
|---|---|---|---|---|
| 21 | -CH$_2$-C$_6$H$_4$-CF$_3$ | -C$_2$H$_5$ | -CH$_2$-C$_6$H$_5$ | 1 |
| 22 | -CH$_2$-C$_6$H$_5$ | -C$_2$H$_5$ | -C$_2$H$_5$ | 1 |
| 23 | -CH$_2$-C$_6$H$_5$ | -n-C$_4$H$_9$ | -n-C$_4$H$_9$ | 1 |
| 24 | -CH$_2$-C$_6$H$_5$ | -n-C$_4$H$_9$ | -i-C$_4$H$_9$ | 1 |
| 25 | -CH$_2$-C$_6$H$_5$ | -n-C$_4$H$_9$ | -sec-C$_4$H$_9$ | 1 |
| 26 | -CH$_2$-C$_6$H$_5$ | -i-C$_4$H$_9$ | -sec-C$_4$H$_9$ | 1 |
| 27 | -CH$_2$-C$_6$H$_5$ | -C$_2$H$_5$ | -n-C$_4$H$_9$ | 2 |
| 28 | -CH$_2$-C$_6$H$_5$ | -C$_2$H$_5$ | -sec-C$_4$H$_9$ | 2 |
| 29 | -CH$_2$-C$_6$H$_5$ | -n-C$_4$H$_9$ | -n-C$_4$H$_9$ | 2 |
| 30 | -CH$_2$-C$_6$H$_5$ | -n-C$_4$H$_9$ | -i-C$_4$H$_9$ | 2 |
| 31 | -CH$_2$-C$_6$H$_5$ | -n-C$_4$H$_9$ | -sec-C$_4$H$_9$ | 2 |
| 32 | -CH$_2$-C$_6$H$_5$ | -i-C$_4$H$_9$ | -i-C$_4$H$_9$ | 2 |
| 33 | -CH$_2$-C$_6$H$_5$ | -i-C$_4$H$_9$ | -sec-C$_4$H$_9$ | 2 |
| 34 | -CH$_2$-C$_6$H$_5$ | -C$_2$H$_5$ | -n-C$_4$H$_9$ | 1 |
| 35 | -CH$_2$-C$_6$H$_5$ | -C$_2$H$_5$ | -sec-C$_4$H$_9$ | 1 |
| 36 | -CH$_2$-C$_6$H$_5$ | -C$_2$H$_5$ | -t-C$_4$H$_9$ | 1 |
| 37 | -CH$_2$-C$_6$H$_5$ | -n-C$_3$H$_7$ | -i-C$_4$H$_9$ | 1 |

TABLE I (Cont.)

| Compound No. | R | $R_1$ | $R_2$ | n |
|---|---|---|---|---|
| 38 | $-CH_2-C_6H_5$ | $-n-C_3H_7$ | $-sec-C_4H_9$ | 1 |
| 39 | $-CH_2-C_6H_5$ | $-i-C_3H_7$ | $-n-C_4H_9$ | 1 |
| 40 | $-CH_2-C_6H_5$ | $-i-C_3H_7$ | $-i-C_4H_9$ | 1 |
| 41 | $-CH_2-C_6H_4-CF_3$ | $-C_2H_5$ | $-n-C_4H_9$ | 1 |
| 42 | $-CH_2-C_6H_4-CF_3$ | $-C_2H_5$ | $-i-C_4H_9$ | 1 |
| 43 | $-CH_2-C_6H_4-CF_3$ | $-n-C_4H_9$ | $-n-C_4H_9$ | 1 |
| 44 | $-CH_2-C_6H_4-CF_3$ | $-C_2H_5$ | thienyl | 1 |
| 45 | $-CH_2-C_6H_4-Cl$ | $-C_2H_5$ | $-i-C_4H_9$ | 1 |
| 46 | $-CH_2-C_6H_4-Cl$ | $-n-C_4H_9$ | $-n-C_4H_9$ | 1 |
| 47 | $-CH_2-C_6H_4-Cl$ | $-C_2H_5$ | thienyl | 1 |
| 48 | $-CH_2-C_6H_4-CH_3$ | $-C_2H_5$ | $-n-C_4H_9$ | 1 |
| 49 | $-CH_2-C_6H_4-CH_3$ | $-C_2H_5$ | $-i-C_4H_9$ | 1 |
| 50 | $-CH_2-C_6H_4-CH_3$ | $-n-C_3H_7$ | $-n-C_3H_7$ | 1 |
| 51 | $-CH_2-C_6H_4-CH_3$ | $-n-C_4H_9$ | $-n-C_4H_9$ | 1 |
| 52 | $-CH_2-C_6H_4-CH_3$ | $-C_2H_5$ | thienyl | 1 |
| 53 | $-CH_2-C_6H_5$ | $i-C_3H_7$ | $-n-C_4H_9$ | 2 |
| 54 | $-CH_2-C_6H_5$ | $-i-C_3H_7$ | $-i-C_3H_7$ | 2 |

TABLE I (Cont.)

| Compound No. | R | $R_1$ | $R_2$ | n |
|---|---|---|---|---|
| 55 | -CH$_2$-C$_6$H$_5$ | -CH$_3$ | -CH$_3$ | 1 |
| 56 | -CH$_2$-C$_6$H$_5$ | -C$_2$H$_5$ | -n-C$_5$H$_{11}$ | 1 |
| 57 | -CH$_2$-C$_6$H$_5$ | -C$_2$H$_5$ | -sec-C$_5$H$_{11}$ | 1 |
| 58 | -CH$_2$-C$_6$H$_5$ | -C$_2$H$_5$ | -(2-thienyl) | 1 |
| 59 | -CH$_2$-(2,3-Cl$_2$C$_6$H$_3$) | -n-C$_3$H$_7$ | -n-C$_3$H$_7$ | 1 |
| 60 | -CH$_2$-(2,3-Cl$_2$C$_6$H$_3$) | -C$_2$H$_5$ | -n-C$_4$H$_9$ | 1 |
| 61 | -CH$_2$-(2,3-Cl$_2$C$_6$H$_3$) | -C$_2$H$_5$ | -sec-C$_4$H$_9$ | 1 |
| 62 | -CH$_2$-(cyclohexyl) | -CH$_3$ | -sec-C$_4$H$_9$ | 1 |
| 63 | -CH$_2$-(cyclohexyl) | -CH$_3$ | -sec-C$_5$H$_{11}$ | 1 |
| 64 | -CH$_2$-(cyclohexyl) | -CH$_3$ | -CH(CH$_3$)-CH(CH$_3$)$_2$ | 1 |
| 65 | -CH$_2$-(cyclohexyl) | -C$_2$H$_5$ | -i-C$_3$H$_7$ | 1 |
| 66 | -CH$_2$-(cyclohexyl) | -C$_2$H$_5$ | -CH$_2$-CH=CH$_2$ | 1 |
| 67 | -CH$_2$-(cyclohexyl) | -C$_2$H$_5$ | -CH(CH$_3$)-CH(CH$_3$)$_2$ | 1 |
| 68 | -CH$_2$-(cyclohexyl) | -i-C$_3$H$_7$ | -i-C$_3$H$_7$ | 1 |
| 69 | -CH$_2$-(cyclohexyl) | -i-C$_3$H$_7$ | -n-C$_5$H$_{11}$ | 1 |

TABLE I (Cont.)

| Compound No. | R | $R_1$ | $R_2$ | $n$ |
|---|---|---|---|---|
| 70 | $-CH_2-C_6H_5$ | $-i-C_3H_7$ | $-\underline{sec}-C_5H_{11}$ | 1 |
| 71 | $-CH_2-C_6H_5$ | $-i-C_4H_9$ | $-i-C_4H_9$ | 1 |
| 72 | $-CH_2-C_6H_5$ | $-\underline{sec}-C_4H_9$ | $-\underline{sec}-C_4H_9$ | 1 |
| 73 | $-CH_2-C_6H_3(Cl)_2$ (2,3-diCl) | $-C_2H_5$ | $-CH_2-CH=CH_2$ | 1 |
| 74 | $-CH_2-C_6H_3(Cl)_2$ (2,3-diCl) | $-C_2H_5$ | $-i-C_4H_9$ | 1 |
| 75 | $-CH_2-C_6H_3(Cl)_2$ (2,3-diCl) | $-i-C_4H_9$ | $-i-C_4H_9$ | 1 |
| 76 | $-CH_2-C_6H_5$ | $-CH_3$ | $-i-C_3H_7$ | 1 |
| 77 | $-CH_2-C_6H_5$ | $-CH_3$ | $-n-C_6H_{13}$ | 1 |
| 78 | $-CH_2-C_6H_5$ | $-C_2H_5$ | $-n-C_3H_7$ | 1 |
| 79 | $-CH_2-C_6H_5$ | $-C_2H_5$ | $-n-C_6H_{13}$ | 1 |
| 80 | $-CH_2-C_6H_5$ | $-n-C_3H_7$ | $-n-C_5H_{11}$ | 1 |
| 81 | $-CH_2-C_6H_5$ | $-n-C_3H_7$ | $-\underline{sec}-C_5H_{11}$ | 1 |
| 82 | $-CH_2-C_6H_5$ | $-n-C_3H_7$ | $-CH(CH_3)-CH(CH_3)_2$ | 1 |
| 83 | $-CH_2-C_6H_5$ | $-CH_3$ | $-CH_2-\text{(tetrahydrothiopyranyl)}$ | 1 |
| 84 | $-CH_2-C_6H_5$ | $-n-C_3H_7$ | $-i-C_3H_7$ | 1 |
| 85 | $-CH_2-C_6H_4-Cl$ | $-CH_3$ | $-CH_2-C_6H_5$ | 1 |

TABLE I (Cont.)

| Compound No. | R | $R_1$ | $R_2$ | $n$ |
|---|---|---|---|---|
| 86 | 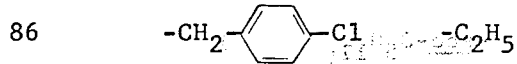 | $-C_2H_5$ |  | 1 |
| 87 | 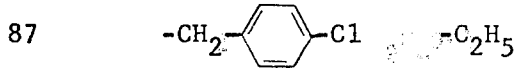 | $-C_2H_5$ |  | 1 |
| 88 |  | $-n-C_3H_7$ |  | 1 |
| 89 | 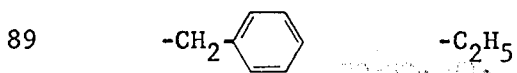 | $-C_2H_5$ | 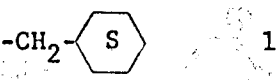 | 1 |

Herbicidal Screening Tests

As previously mentioned, the novel compounds herein described are phytotoxic compounds which are useful and valuable in controlling various plants species. Compounds of this invention are tested as herbicides in the following manner.

Pre-emergence Herbicide Screening Test

Using an analytical balance, 20 mg. of the compound to be tested is weighed out on a piece of glassine weighing paper. The paper and compound are placed in a 30 ml. wide-mouth bottle and 3 ml. of acetone containing 1% Tween 20 is added to dissolve the compound. If the material is not soluble in acetone, another solvent such as water, alcohol or dimethylformamide (DMF) is used instead. When DMF is used, only 0.5 ml. or less is used to dissolve the compound and then another solvent is used to make the volume up to 3 ml. The 3 ml. of solution is sprayed uniformly on the soil contained in a small Styrofoam flat one day after planting weed seeds in the flat of soil. A No. 152 DeVilbiss atomizer is used to apply the spray using compressed air at a pressure of 5 lb./sq. in. The rate of application is 8 lb./acre and the spray volume is 143 gal./acre.

On the day preceding treatment, the Styrofoam flat, which is 7 inches long, 5 inches wide and 2.75 inches deep, is filled to a depth of 2 inches with loamy-sand soil. Seeds of seven different weed species are planted in individual rows using one species per row across the width of the flat. The seeds are covered with soil so that they are planted at a depth of 0.5 inch. The seeds used are hairy crabgrass (*Digitaria sanguinalis*), yellow foxtail (*Setaria glauca*), redroot pigweed (*Amaranthus retroflexus*), Indian mustard (*Brassica juncea*) and curly dock (*Rumex crispus*). Ample seeds are planted to give about 20 to 50 seedlings per row after emergence depending on the size of the plants.

After treatment, the flats are placed in the greenhouse at a temperature of 70° to 85°F. and watered by sprinkling. Two weeks after treatment the degree of injury or control is determined by comparison with untreated check plants of the same age. The injury rating from 0 to 100% is recorded for each species as percent control with 0% representing no injury and 100% representing complete kill.

Post-emergence Herbicide Screening Test

Seeds of six plant species, including hairy crabgrass, watergrass, red oat, mustard, curly dock and Pinto beans (*Phaseolus vulgaris*) are planted in the Styrofoam flats as described above for pre-emergence screening. The flats are placed in the greenhouse at 70° to 85°F. and watered daily with a sprinkler. About 10 to 14 days after planting when the primary leaves of the bean plants are almost fully expanded and the first trifoliate leaves are just starting to form, the plants are sprayed. The spray is prepared by weighing out 20 mg. of the test compound, dissolving it in 5 ml. of acetone containing 1% Tween 20 and then adding 5 ml. of water. The solution is sprayed on the foliage using a No. 152 DeVilbiss atomizer at an air pressure of 5 lb./sq. in. The spray concentration is 0.2 and the rate is 8 lb./acre. The spray volume is 476 gal./acre.

Injury ratings are recorded 14 days after treatment. The rating system is the same as described above for the preemergence test. The injury symptoms are also the same as listed above for the pre-emergence test, except that IG (inhibited germination) is not used since the seeds have already germinated before treatment in the post-emergence screening test.

The results of these tests are shown in Table II.

TABLE II

HERBICIDAL ACTIVITY - SCREENING RESULTS
Per Cent Control* at 8 lb./A

| Compound No. | Pre-emergence | Post-emergence |
|---|---|---|
| 1 | 10 | 45 |
| 2 | 89 | 88 |
| 3 | 8 | 0 |
| 4 | 53 | 18 |
| 5 | 99.7 | 93 |
| 6 | 99.9 | 87 |
| 7 | 99 | 87 |
| 8 | 76 | 75 |
| 9 | 88 | 60 |
| 10 | 90 | 76 |
| 11 | 91 | 25 |
| 12 | 75 | 15 |
| 13 | 93 | 32 |
| 14 | 87 | 72 |
| 15 | 82 | 48 |
| 16 | 27 | 10 |
| 17 | 37 | 17 |
| 18 | 57 | 20 |
| 19 | 68 | 40 |
| 20 | 17 | 42 |

TABLE II-Continued

HERBICIDAL ACTIVITY - SCREENING RESULTS
Per Cent Control* at 8 lb./A

| Compound No. | Pre-emergence | Post-emergence |
|---|---|---|
| 22 | 92 | 63 |
| 23 | 90 | 47 |
| 24 | 90 | 75 |
| 25 | 94 | 72 |
| 26 | 91 | 75 |
| 27 | 27 | 15 |
| 31 | 14 | 0 |
| 34 | 88 | 73 |
| 35 | 99 | 95 |
| 36 | 46 | 48 |
| 37 | 100 | 85 |
| 38 | 98 | 91 |
| 39 | 94 | 87 |
| 40 | 96 | 74 |
| 41 | 78 | 43 |
| 42 | 90 | 50 |
| 43 | 37 | 37 |
| 44 | 87 | 62 |
| 45 | 90 | 75 |
| 46 | 64 | 63 |
| 47 | 81 | 74 |
| 48 | 90 | 77 |
| 49 | 96 | 79 |
| 50 | 95 | 85 |
| 51 | 80 | 70 |
| 52 | 92 | 76 |
| 53 | 0 | 32 |
| 54 | 49 | 57 |
| 55 | 69 | 73 |
| 56 | 86 | 53 |
| 57 | 87 | 78 |
| 58 | 89 | 63 |
| 59 | 77 | 45 |
| 60 | 58 | 43 |
| 61 | 96 | 48 |
| 62 | 99 | 83 |
| 63 | 99 | 81 |
| 64 | 99.9 | 93 |
| 65 | 99.9 | 92 |
| 66 | 95 | 62 |
| 67 | 100 | 90 |
| 68 | 100 | 86 |
| 69 | 93 | 77 |
| 70 | 100 | 82 |
| 71 | 100 | 82 |
| 72 | 100 | 88 |
| 73 | 73 | 80 |
| 74 | 91 | 85 |
| 75 | 99.6 | 85 |
| 76 | 96 | 91 |
| 77 | 64 | 83 |
| 78 | 98 | 83 |
| 79 | 88 | 78 |
| 80 | 91 | 79 |
| 81 | 100 | 91 |
| 82 | 100 | 92 |
| 83 | 38 | 32 |
| 84 | 90 | 78 |
| 85 | 21 | 0 |
| 87 | 62 | 0 |
| 88 | 42 | 0 |
| 89 | 67 | 40 |

Per Cent Control at 20 lb./A

| Compound No. | Pre-emergence | Post-emergence |
|---|---|---|
| 21 | 43 | — |
| 28 | 29 | — |
| 29 | 0 | 7 |
| 30 | 0 | 8 |
| 32 | 21 | — |
| 33 | 0 | 8 |
| 86 | 27 | — |

*Average for seven plant species in the pre-emergence test and for six plant species in the post-emergence test.

The compounds of the present invention can be used in any convenient form. Thus, the compounds can be made into emulsifiable liquids, emulsifiable concentrates, liquid, wettable powder, powders, granular or any other convenient form, and applied to the soil to control the undesired vegetation.

The terms lower alkyl, alkenyl and alkynyl are meant to include those compounds having straight or branched chain configurations having from 1 to 6 carbon atoms, inclusive.

What is claimed is:

1. A process for manufacturing a compound having the formula:

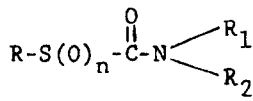

wherein $n$ is 1 or 2; R is selected from the group consisting of halophenyl, phenalkyl, substituted phenalkyl wherein said substituents are selected from halogen, alkyl having 1-6 carbon atoms and haloalkyl having 1 to 6 carbon atoms; $R_1$ and $R_2$ can be the same or different and are selected from lower alkyl having 1 to 6 carbon atoms, cyclohexyl, alkylcyclohexyl, alkenyl, alkynyl and benzyl, comprising the steps of:

a. reacting an oxidizing agent selected from peracetic acid and m-chloroperoxybenzoic acid with a thiocarbamate in the presence of an inert solvent; said thiocarbamate having the formula:

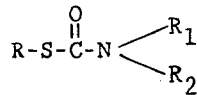

wherein said R, $R_1$ and $R_2$ have been previously defined.

b. said reaction being carried out at a temperature of between −25°C. and 65°C.;

c. said oxidizing agent being present in an amount of at least one molar equivalent.

2. The process of claim 1 wherein said oxidizing agent is m-chloroperoxybenzoic acid.

* * * * *